US012747033B2

(12) United States Patent
Neuman et al.

(10) Patent No.: US 12,747,033 B2
(45) Date of Patent: Sep. 29, 2026

(54) CABLE ROUTING THROUGH ROTATABLE-WING AIRCRAFT SPARS

(71) Applicant: Toyota Motor Engineering & Manufacturing North America, Inc., Plano, TX (US)

(72) Inventors: Tom M. Neuman, Fairfax, VA (US); Matthew M Warren, Silver Spring, MD (US); Frank K. Kozel, Glen Burnie, MD (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 19/254,436

(22) Filed: Jun. 30, 2025

(65) Prior Publication Data

US 2026/0274437 A1 Sep. 17, 2026

Related U.S. Application Data

(60) Provisional application No. 63/770,538, filed on Mar. 12, 2025.

(51) Int. Cl.
*B64D 47/00* (2006.01)
*B64C 1/26* (2006.01)
(Continued)

(52) U.S. Cl.
CPC ................ *B64D 47/00* (2013.01); *B64C 1/26* (2013.01); *B64C 27/52* (2013.01); *B64C 29/0033* (2013.01); *B64D 2221/00* (2013.01)

(58) Field of Classification Search
CPC ....... B64C 29/0033; B64C 27/52; B64C 1/26; B64D 35/00; B64D 47/00; B64D 2221/00
See application file for complete search history.

(56) References Cited

U.S. PATENT DOCUMENTS 2,580,312 A * 12/1951 Moore .................... B64C 27/26
244/7 C
2,708,081 A * 5/1955 Dobson ............... B64C 29/0033
D12/326
(Continued)

FOREIGN PATENT DOCUMENTS

CN 103625642 A 3/2014
CN 114212252 A 3/2022
(Continued)

OTHER PUBLICATIONS

"Il Bell Boeing V-22 Osprey (falco pescatore)", Jun. 5, 2020, Si vis pacem, para bellum blog, <https://svppbellum.blogspot.com/2020/06/il-bell-boeing-v-22-osprey-falco.html> (Year: 2020).*
(Continued)

*Primary Examiner* — Michael H Wang
(74) *Attorney, Agent, or Firm* — Christopher G. Darrow; Darrow Mustafa PC

(57) ABSTRACT

A cable routing system described herein relates to facilitating the rotation of wings and a fuselage of a rotatable-wing aircraft via a load transfer structure. In one embodiment, the cable routing system includes a first hollow shaft extending through a first wing attached to a fuselage of an aircraft and a second hollow shaft extending through a second wing attached to the fuselage. The hollow shafts rotate about a pitch axis independently of the fuselage. The cable routing system also includes a load transfer structure coupled to adjacent outlets of the hollow shafts that are within the fuselage. Cables within the hollow shafts exit the adjacent outlets perpendicularly away from a longitudinal axis of the hollow shafts. The load transfer structure facilitates rotation of the hollow shafts.

12 Claims, 7 Drawing Sheets

(51) Int. Cl.
*B64C 27/52* (2006.01)
*B64C 29/00* (2006.01)

(56) References Cited

U.S. PATENT DOCUMENTS

| | | | | |
|---|---|---|---|---|
| 3,179,352 | A | 4/1965 | Nelson | |
| 4,375,280 | A | 3/1983 | Nicolaides | |
| 5,141,176 | A | 8/1992 | Kress et al. | |
| 5,340,057 | A | 8/1994 | Schmittle | |
| 5,395,073 | A * | 3/1995 | Rutan | B64C 29/02 244/38 |
| 5,765,777 | A | 6/1998 | Schmittle | |
| 5,863,013 | A | 1/1999 | Schmittle | |
| 5,941,478 | A * | 8/1999 | Schmittle | B64C 29/0033 244/131 |
| 7,441,724 | B2 | 10/2008 | Parks | |
| 7,506,837 | B2 * | 3/2009 | Parks | G05D 1/0669 244/7 B |
| 7,510,143 | B1 | 3/2009 | Bertelsen et al. | |
| 8,660,712 | B2 | 2/2014 | Grabowsky et al. | |
| 9,527,577 | B2 | 12/2016 | Embacher | |
| 9,727,059 | B2 | 8/2017 | Greenfield et al. | |
| 10,336,436 | B2 | 7/2019 | Siu et al. | |
| 10,370,082 | B2 | 8/2019 | Har et al. | |
| 10,370,100 | B2 | 8/2019 | Rothhaar et al. | |
| 10,414,484 | B2 | 9/2019 | Moxon | |
| 10,562,608 | B1 * | 2/2020 | Gornall | B64C 11/32 |
| 10,589,854 | B2 | 3/2020 | Alber et al. | |
| 10,747,235 | B2 | 8/2020 | Irwin et al. | |
| 10,946,455 | B2 | 3/2021 | Sigafoose | |
| 11,577,835 | B2 | 2/2023 | Ivans et al. | |
| 11,603,195 | B2 * | 3/2023 | Giannini | B64C 11/28 |
| 11,718,397 | B2 * | 8/2023 | Ross | B64C 29/0033 244/7 A |
| 11,733,715 | B2 | 8/2023 | Shi et al. | |
| 11,851,172 | B1 | 12/2023 | Moretti et al. | |
| 12,084,175 | B2 | 9/2024 | Ivans et al. | |
| 12,084,176 | B2 | 9/2024 | Giannini | |
| D1,054,959 | S | 12/2024 | Schmidt et al. | |
| 12,246,826 | B2 * | 3/2025 | Waide | B64C 27/72 |
| 2013/0099065 | A1 | 4/2013 | Stuhlberger | |
| 2017/0174342 | A1 | 6/2017 | Huang | |
| 2018/0065739 | A1 * | 3/2018 | Vondrell | B64D 27/33 |
| 2019/0100303 | A1 * | 4/2019 | Campbell | B64C 27/26 |
| 2020/0010182 | A1 | 1/2020 | Renteria | |
| 2020/0031462 | A1 | 1/2020 | Svoboda, Jr. | |
| 2020/0283134 | A1 * | 9/2020 | Mores | B64U 10/13 |
| 2021/0139140 | A1 | 5/2021 | Arlton et al. | |
| 2024/0076066 | A1 | 3/2024 | Moore et al. | |

FOREIGN PATENT DOCUMENTS

| | | | |
|---|---|---|---|
| CN | 112319795 | B | 8/2024 |
| CN | 119262282 | A | 1/2025 |
| CN | 119460076 | A | 2/2025 |
| DE | 1756924 | A1 | 1/1972 |
| EP | 0976651 | A2 | 2/2000 |
| EP | 2383159 | A2 | 11/2011 |
| EP | 3296202 | A1 | 3/2018 |
| EP | 4091940 | A1 | 11/2022 |
| GB | 981591 | A | 1/1965 |
| GB | 2578174 | A | 4/2020 |
| WO | 1998023482 | A1 | 6/1998 |
| WO | 2011140702 | A1 | 11/2011 |
| WO | 2020219278 | A1 | 10/2020 |

OTHER PUBLICATIONS

Pending U.S. Appl. No. 18/334,777, filed Jun. 14, 2023.

Gee, Shu. Flight tests of a radio-controlled airplane mode with a free-wing, free-canard configuration. No. H-1008. 1978.

Porter et al. Analytical Study of a Free-wing/free-trimmer Concept. No. NASA-CR-2946. 1978.

Chen et al. "Stability, control and gust response characteristics of an ultralight freewing airplane." Guidance, Navigation and Control Conference. 1992.

Ormiston, Robert. "Experimental investigation of stability and stall flutter of a free-floating wing V/STOL model." No. NASA-TN-D-6831. 1972.

Chen et al. "A wind tunnel test of a tilt-body freewing aircraft including thrust effects," 13th Applied Aerodynamics Conference. 1995.

Axten et al. "Multi-Outer Loop Adaptive Control for a VTOL Free-Wing Aircraft." AIAA SciTech 2024 Forum. 2024.

Axten et al. "Practical Considerations for a VTOL Free-Wing UAS." AIAA Scitech 2025 Forum. 2025.

Galls et al. "Aerodynamic investigations of the freewing tilt-body UAV." 36th AIAA Aerospace Sciences Meeting and Exhibit. 1998.

Ro et al. "Dynamic Modeling of Articulated Wing-Body-Tail Unmanned Aerial Vehicle." 43rd AIAA Aerospace Sciences Meeting and Exhibit. 2005.

Unknown, "Variable-incidence wing," Retrieved from the Internet: <https://en.wikipedia.org/wiki/Variable-incidence_wing>, Retrieved Aug. 15, 2025. (2 pages).

Sadraey, Mohammad. "Chapter 5 Wing Design," Aircraft design: a systems engineering approach 808 (2012).

Maqsood et al. "Optimization of hover-to-cruise transition maneuver using variable-incidence wing." Journal of Aircraft 47.3 (2010): 1060-1064.

Unknown, "Ling-Temco-Vought XC-142A Tri Service," Retrieved from the Internet: <https://www.aviastar.org/helicopters_eng/ling_xc-142.php>, Retrieved Jun. 25, 2025. (5 pages).

Unknown, "Vought F-8 Crusader," Retrieved from the Internet: <https://en.wikipedia.org/wiki/Vought_F-8_Crusader>, Retrieved Jun. 25, 2025. (15 pages).

Unknown, "NASA GL-10 Greased Lightning," Retrieved from the Internet: <https://en.wikipedia.org/wiki/NASA_GL-10_Greased_Lightning>, Retrieved Nov. 18, 2025. (2 pages).

Peter Ulyakin, "Takeoff from the tail—an experimental fighter Lockheed XFV-1 Salmon," Retrieved from the Internet: <https://en.topwar.ru/31869-vzlet-s-hvosta-eksperimentalnyy-istrebitel-lockheed-xfv-1-salmon.html>, Retrieved Mar. 11, 2025. (27 pages).

Unknown, "Lazair—Twin Engine Ultralight Aircraft," Retrieved from the Internet: <https://www.pilotmix.com/lazair>, Retrieved Mar. 11, 2025. (4 pages).

Unknown, "FVR-55 Airframe | L3Harris Fast. Forward.", Retrieved from the Internet: <https://www.l3harris.com/all-capabilities/fvr-55-airframe>, Retrieved Mar. 11, 2025. (6 pages).

Unknown, "Convair XFY-1 Pogo," Retrieved from the Internet: <https://airandspace.si.edu/collection-objects/convair-xfy-1-pogo/nasm_A19730274000>, Retrieved Mar. 11, 2025. (7 pages).

Unknown, "FVR-90 Airframe," Retrieved from the Internet: <https://www.l3harris.com/all-capabilities/fvr-90-airframe>, Retrieved Mar. 11, 2025. (7 pages).

Unknown, "Bugatti 100p," Retrieved from the Internet: <https://bugatti100p.aero/>, Retrieved Mar. 11, 2025. (4 pages).

Unknown, "The Quickie Q2 | EAA," Retrieved from the Internet: <https://www.eaa.org/eaa/news-and-publications/eaa-news-and-aviation-news/bits-and-pieces-newsletter/03-14-2017-the-quickie-q2>, Retrieved Mar. 11, 2025. (5 pages).

Unknown, "Boeing Images—A160 Hummingbird Unmanned Aerial Vehicle In Flight," Retrieved from the Internet: <https://secure.boeingimages.com/archive/A160-Hummingbird-Unmanned-Aerial-Vehicle-In-Flight-2F3XC5KTO38. html>, Retrieved Mar. 11, 2025. (1 page).

Unknown, "MQ-1B Predator," Retrieved from the Internet: <https://www.af.mil/About-Us/Fact-Sheets/Display/Article/104469/mq-1b-predator/>, Retrieved Mar. 11, 2025. (5 pages).

Joseph Noronha, "Gnat—The IAF's Small "Sabre Slayer"," Retrieved from the Internet: <https://www.sps-aviation.com/story/?id=3189&h=Gnat-The-IAFs-Small-Sabre-Slayer>, Retrieved Mar. 11, 2025. (3 pages).

Unknown, "Amber Aviation," Retrieved from the Internet: <https://onespotter.com/airline/22285/Amber%20Aviation>, Retrieved Mar. 11, 2025. (2 pages).

(56) References Cited

OTHER PUBLICATIONS

Unknown, "Mini-IMP Aircraft Company," Retrieved from the Internet: <https://www.mini-imp.com/>, Retrieved Mar. 11, 2025. (1 page).
Unknown, "Wingcopter 178 UAV," Retrieved from the Internet: <https://www.ust-media.com/ust-magazine/UST024/26/>, Retrieved Mar. 11, 2025. (2 pages).
Unknown, "SNECMA Coléoptère," Retrieved from the Internet: <https://en.wikipedia.org/wiki/SNECMA_Col%C3%A9opt%C3%A8re>, Retrieved Mar. 21, 2025. (4 pages).
Youtube, "Lockheed XFV-1 Prototype fighter aircraft", Retrieved from the Internet: <https://youtu.be/0XQcn0B3HBg?si=vqnjGvF1apKI4Xnz>, Retrieved May 13, 2025. (2 pages).
Unknown, "Tailsitter Planes," Retrieved from the Internet: <https://ardupilot.org/plane/docs/guide-tailsitter.html>, Retrieved Mar. 21, 2025. (15 pages).
Rohr et al. "Attitude and cruise control of a VTOL tiltwing UAV." IEEE Robotics and Automation Letters, vol. 4 issue 3. (2019).
Frank et al. "Hover, transition, and level flight control design for a single-propeller indoor airplane." AIAA Guidance, Navigation and Control Conference and Exhibit. 2007.
Takahashi et al. "Modeling of propeller electric airplane and thrust control using advantage of electric motor." 2014 IEEE 13th International Workshop on Advanced Motion Control (AMC). IEEE, 2014.
Papachristos et al. "Design and experimental attitude control of an unmanned tilt-rotor aerial vehicle." 2011 15th International Conference on Advanced Robotics (ICAR). IEEE, 2011.
Theys et al. "A control approach for transitioning VTOL UAVs with continuously varying transition angle and controlled by differential thrust." 2016 international conference on unmanned aircraft systems (ICUAS). IEEE, 2016.
Hua et al. "Control of VTOL vehicles with thrust-tilting augmentation," Automatica 52 (2015).
Neuman et al., U.S. Appl. No. 19/206,756, filed May 13, 2025.
Neuman et al., U.S. Appl. No. 19/207,506, filed May 14, 2025.
Neuman et al., U.S. Appl. No. 19/395,269, filed Nov. 20, 2025.
Neuman et al., U.S. Appl. No. 19/395,300, filed Nov. 20, 2025.
Haviland et al., "Dynamic Modeling and Analysis of a VTOL Freewing Concept", American Institute of Aeronautics and Astronautics, Jan. 1, 2016.
Axten et al., "Stabilizing a VTOL Freewing Testbed Vehicle in Hover", American Institute of Aeronautics and Astronautics, Jan. 5, 2020.
Axten et al., "VTOL Freewing Testbed Vehicle in Hover and Forward Flight", American Institute of Aeronautics and Astronautics, Jan. 4, 2021.
Aero News Network, "Aurora Flight Sciences Celebrates 100th GoldenEye-50 Flight", Retrieved from the Internet: <http://www.aero-news.net/index.cfm?do=main.textpost&id=6bf6c3a4-994b-4868-87e4-924be9ce8789>, retrieved Jan. 23, 2023. (1 page).
Colugo, "Models—Colugo", Retrieved from the Internet: <https://www.colugo-sys.com/models/>, retrieved Jun. 14, 2023. (7 pages).
Freewing Aerial Robotics Corp., "Briefing Slides", Commercial Communications & Military Reconnaissance Systems. (52 pages).
Chen et al., "A Wind Tunnel Test of a Tilt-body Freewing Aircraft Including Thrust Effects", American Institute of Aeronautics and Astronautics, 1995.

* cited by examiner

CABLE ROUTING THROUGH ROTATABLE-WING AIRCRAFT SPARS

CROSS-REFERENCE TO RELATED APPLICATIONS

This application claims the benefit of U.S. Provisional Application No. 63/770,538, filed on Mar. 12, 2025, which is herein incorporated by reference in its entirety.

TECHNICAL FIELD

The subject matter described herein relates, in general, to rotatable-wing aircraft and, more particularly, to cable routing systems in rotatable-wing aircraft where wings of the aircraft rotate about the pitch axis independently of the fuselage.

BACKGROUND

In an airplane, lift is created as air travels over the wing while the airplane moves forward. As such, a fixed-wing airplane must be moving in a horizontal direction to remain aloft. In a helicopter, lift is created by a vertically oriented rotating propeller. As such, a helicopter has the capability of vertical takeoff and landing (VTOL) and can hover in the air. However, a helicopter cannot travel as fast as an airplane in a horizontal direction.

Rotatable-wing aircraft, such as tilt-wing and free-wing aircraft, combine the forward flight aspects of a fixed-wing aircraft with the VTOL and hover capability of a helicopter. Specifically, rotatable-wing aircraft have wings that pivot about a pitch axis of the aircraft independently from the fuselage of the aircraft. The wings may be connected to the fuselage via bearings or bushings that pivot freely, i.e., with minimal mechanical friction or damping, in pitch. In rotatable-wing aircraft, all other degrees of freedom (roll, yaw, heave, sway, surge) may be rigidly connected between the fuselage and wing. Propellers, or other thrusters, may be attached to the wings to drive the aircraft. Rotatable-wing aircraft may exhibit enhanced maneuverability and facilitate unique flying motions, such as vertical and horizontal flight modes.

SUMMARY

In one embodiment, example systems relate to a manner of improving rotatable-wing aircraft operation by routing cables between the independently pivoting bodies (i.e., the fuselage and the wings).

In one embodiment, a cable routing system is described. The cable routing system includes 1) a first hollow shaft extending through a first wing attached to a fuselage of an aircraft and 2) a second hollow shaft extending through a second wing attached to the fuselage. Both hollow shafts rotate about a pitch axis independently of the fuselage. The cable routing system also includes a load transfer structure coupled to adjacent outlets of the hollow shafts that are within the fuselage. Cables within the hollow shafts exit the adjacent outlets perpendicularly away from a longitudinal axis of the hollow shafts. The load transfer structure facilitates coordinated rotation of the hollow shafts.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems associated with improving rotatable-wing aircraft operation are disclosed herein. As previously described, a rotatable-wing aircraft is one in which the wings of the aircraft independently, and in some cases freely, rotate about a pitch axis relative to the aircraft fuselage. While such aircraft undoubtedly provide enhanced maneuverability and control, some features may limit their flight efficacy.

Figure 1A:
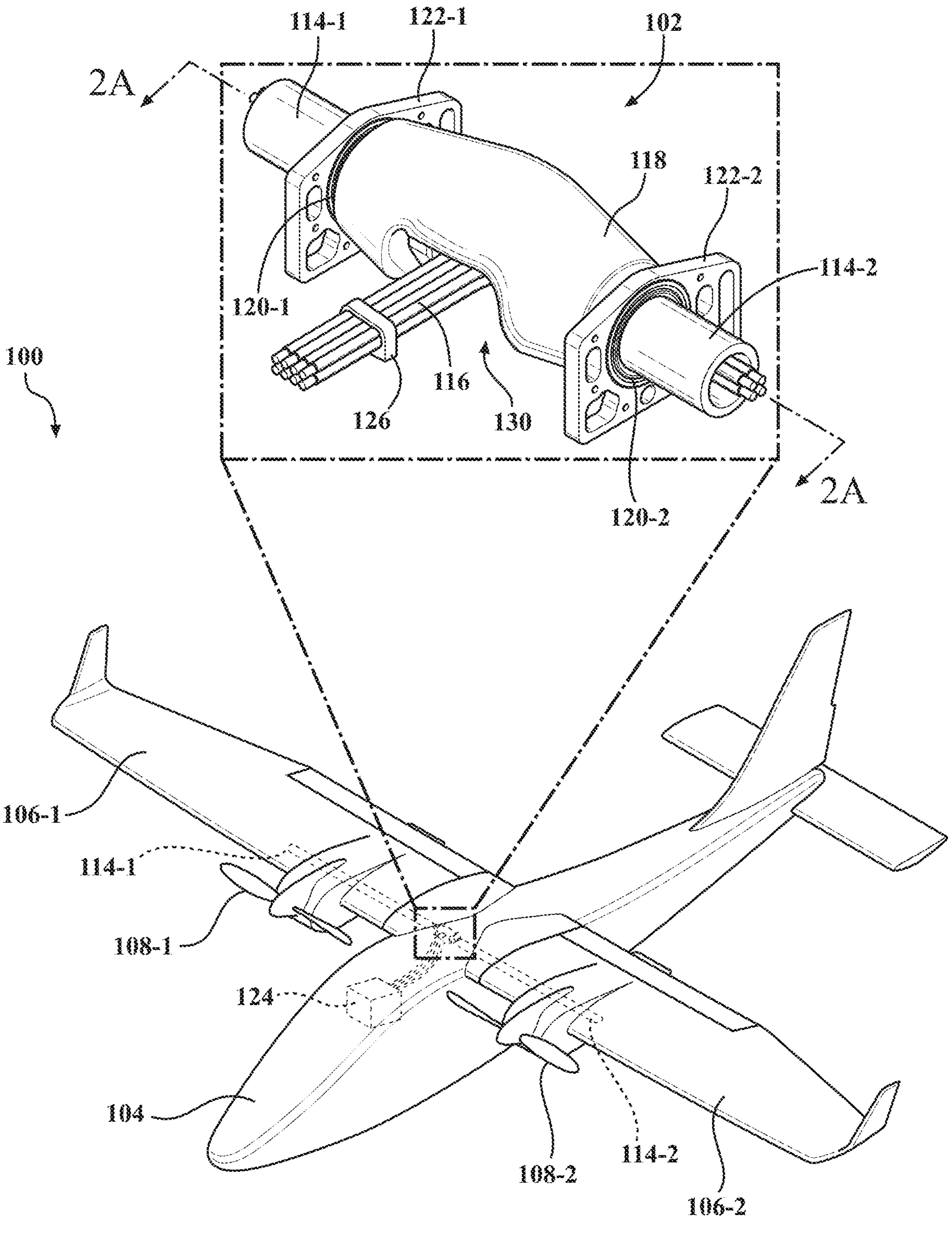
FIGS. 1A and 1B illustrate one embodiment of a rotatable-wing aircraft within which the cable routing system may be implemented.
Figure 1B:
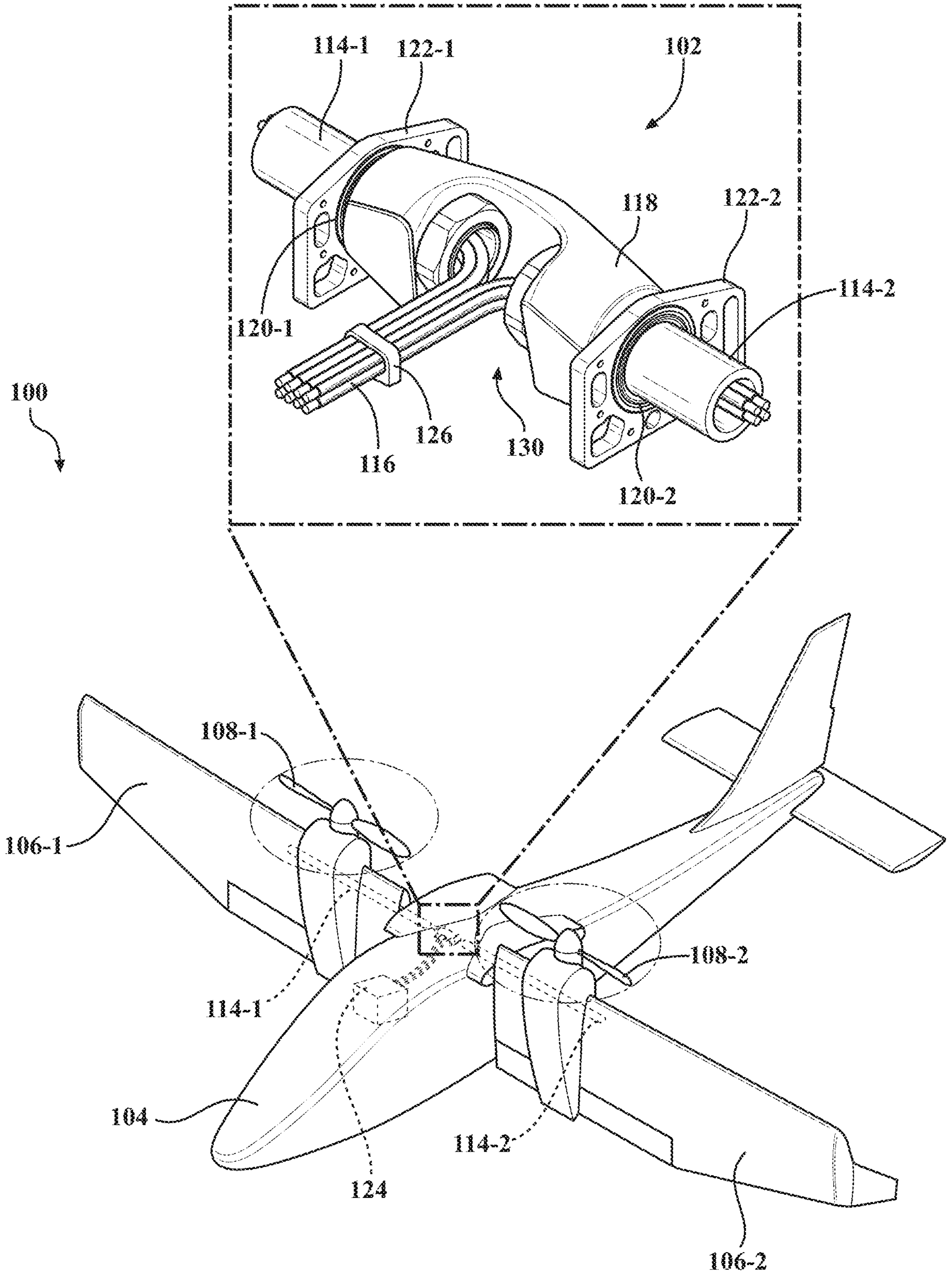

For example, in some cases, such as that depicted in FIGS. 1A and 1B of the present specification, a propulsion system (whether an electric propulsion system as depicted in FIGS. 1A and 1B or some other propulsion system) may be mounted to the aircraft wings. Accordingly, cables may pass between the aircraft wings and the aircraft fuselage, which cables facilitate the operation of the aircraft. As a specific example, in the case of an electrical propulsion system such as motorized propellers, thick wires may connect the wing-mounted motors to batteries within the fuselage. The thick wires that transmit the high electric current are set inside tubes. Placing the thick wires within the tube may allow wing rotation without the cables protruding from the fuselage or wing and may minimize the wire travel distance during rotation, thereby using space more efficiently in the aircraft. However, rotatable-wing aircraft may exhibit greater than 100 degrees of rotational motion about a pitch axis relative to the fuselage, and in some cases up to and greater than 160 degrees. This type of rotation may put strain/stress on the cables passing from the wings to the fuselage.

Moreover, some rotatable-wing aircraft, known as free-wing aircraft, have wings that freely rotate relative to the fuselage, without any powered actuation. In these aircraft, the cables themselves may oppose the free rotation of the wings. That is, free-wing aircraft are more effective if this axial rotation of the wings is unencumbered by friction or torsional resistance. If not properly accommodated, wires or cables exiting the hollow shafts, perpendicular to the wing and shaft structure, may bend or otherwise create a torsion spring-like resistance to the wing pitch rotation, negatively impacting the free-wing operation.

Accordingly, the present specification describes a cable routing system for a rotatable-wing aircraft where the wings of the aircraft rotate independently from the fuselage of the aircraft. Specifically, the cable routing system prevents wire bending and facilitates a friction-reduced free rotation of the wings relative to the fuselage.

The cable routing system includes two hollow shafts (which may be wing spars or portions of wing spars) in which electrical cables or other components (whether electrical, fluid, or other) are passed. The cable routing system also includes a load transfer structure through which the wires exit perpendicularly away from the longitudinal axis of the hollow shafts. The load transfer structure includes at least a 90° slot so as not to block the cables and not impede the free rotation of the tubular structure/wing.

A large slot in the structure, rather than a component-sized aperture, prevents wire bending. While the cables in the present system may longitudinally twist as the wings rotate, the twisting motion induces less stress on the cables than a bending motion. That is, bending may lead to a shortened lifespan of the cables due to the cyclic stress induced in the cables, which stress may be greater than the stress induced by longitudinal twisting. Further, the cable twisting inside the hollow shafts requires no additional clearance volume inside the aircraft, compared to the cable bending, which requires clearance to sweep through some volume inside the aircraft.

Moreover, cable bending may act like a torsion spring that biases the wing to a predetermined rotational position. That is, the torsion provided by bending cables may impede the free pitching rotation of the wings, which is a target operation of a free-wing aircraft. By comparison, a slotted load transfer structure as described herein prevents cable bending and the rotation-opposing forces that such bending induces.

The load transfer structure also includes structural reinforcement surrounding the slot to reduce bending stress and increase the torsional stiffness of the system. That is, removing mass from a tubular structure, such as when forming a 90° to 160° slot, may reduce the capability of the structure to support and withstand the bending and torsional forces that result from operation of the aircraft (i.e., from rotation of the wings relative to the fuselage). The reinforcement portion of the load transfer structure reacts (i.e., provides a reactive force or support against) the bending and torsion loads triggered by the action of the freely pitching wings.

In this way, the disclosed systems, methods, and other embodiments improve rotatable-wing aircraft operation by reducing the strain on the housed components, whether the housed components are electrical cables, fluidic cables, mechanical cables/wires, or other components. Moreover, the cable routing system also reduces the spring-like effect that may result were the housed components forced to bend instead of longitudinally twist.

Turning now to the figures, FIGS. 1A and 1B illustrate one embodiment of a rotatable-wing aircraft 100 within which the cable routing system 102 may be implemented. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the aircraft 100 includes a cable routing system 102.

In general, the aircraft 100 includes a fuselage 104, or body, in which mechanical, electrical, and/or control systems are housed. As described above, the aircraft 100 may have a variety of uses, and the flight control components specific to the particular use may be housed within the fuselage 104. As a particular example, the aircraft 100 may be unmanned. In this case, the fuselage 104 houses a communication system for receiving and executing commands from a remote operator. In another example, the aircraft 100 is locally operated by a pilot on board the aircraft 100. In this example, the fuselage 104 includes a cockpit where the pilot sits to control the aircraft 100.

The aircraft 100 also includes a pair of wings 106-1 and 106-2 extending away from the fuselage 104. The wings 106-1 and 106-2 in combination may be referred to as a wing assembly. As described above, the aircraft 100 may be a rotatable-wing aircraft in which the wing assembly (including both wings 106-1 and 106-2) rotates independently about a pitch axis of the fuselage 104 of the aircraft 100. That is, even when the fuselage 104 is held in a predetermined pitch orientation, the wing assembly may change pitch orientation as depicted between FIGS. 1A and 1B.

In one specific example, the aircraft 100 may be a free-wing aircraft in which the wing assembly (including both wings 106-1 and 106-2) freely rotates independently about a pitch axis of the fuselage 104 of the aircraft 100, without any mechanical actuation.

In a rotatable-wing aircraft, the wings 106-1 and 106-2 and fuselage 104 are coupled together via bearings or bushings that pivot freely, i.e., with minimal mechanical friction or damping, in pitch. In one example, the wings 106-1 and 106-2 of a rotatable-wing aircraft are rigidly coupled to one another such that the entire wing assembly rotates as a single unit independently of the fuselage 104. In another example, each wing 106-1 and 106-2 is independently rotatable about the pitch axis relative to the other wing and the fuselage 104.

The aircraft 100 also includes thrusters, which in the example depicted in FIGS. 1A and 1B are propellers 108-1 and 108-2 mounted to respective wings 106-1 and 106-2. A thruster is any device or engine that generates thrust to move or control the aircraft 100. While FIGS. 1A and 1B depict propellers 108-1 and 108-2 as the thrusters, the aircraft 100 may include different kinds of thrust sources, such as jet engines and ducted fans, among others.

As described above, it may be that the thrusters (e.g., the propellers 108-1 and 108-2) are mounted to the respective wings 106-1 and 106-2, and the power source for the thrusters is located on or in the fuselage 104. For example, as depicted in FIGS. 1A and 1B, the propellers 108-1 and 108-2 may be mounted to respective wings 106-1 and 106-2, while a battery 124 may be found in the fuselage 104. Note that while FIGS. 1A and 1B depict the battery 124 in a particular location, the battery 124 may be located elsewhere. Moreover, while FIGS. 1A and 1B depict a propeller-type thruster, the thrusters may be of other types, such as jet engines, in which case the power source may differ. For example, for a jet engine thruster, a fuel cell or fuel tank may be located in the fuselage 104.

In either case, the pitching of the wing assembly relative to the fuselage 104 may complicate the power transmission between the fuselage 104 and the wing assembly. Accordingly, the aircraft 100 may include a cable routing system 102 that 1) accommodates the rotation of these two bodies, 2) facilitates power transfer between the rotating bodies, 3) prevents stress on the cables, and 4) reduces the rotation-resisting forces that the bending cables may induce.

The cable routing system 102 includes various components that support the load transferring and rotation-enabling functions described herein. Specifically, the cable routing system 102 includes a first hollow shaft 114-1 that extends through a first wing 106-1, which first wing 106-1 is attached to the fuselage 104 of the aircraft 100. In an example, the first hollow shaft 114-1 may be a spar that runs at least partially through the length of the first wing 106-1. In another example, the first hollow shaft 114-1 is a separate component that is coupled to the first wing spar. That is to say, the first hollow shaft 114-1 may be a component of the first wing 106-1 and may be attached to a load transfer structure affixed to the fuselage 104.

The cable routing system 102 includes a second hollow shaft 114-2 that extends through a second wing 106-2 that is attached to the fuselage 104 of the aircraft 100. In an example, the second hollow shaft 114-2 may be a spar that runs at least partially through the length of the second wing 106-2. In another example, the second hollow shaft 114-2 is a separate component that is inserted into the second wing spar. That is to say, the second hollow shaft 114-2 may be a component of the second wing 106-2 and is attached to a load transfer structure affixed to the fuselage 104. In another example, the second hollow shaft 114-2 is affixed to the fuselage 104, and the second wing 106-2 is attached, via wing-mounted bearings 120-2 and bearing housings 122-2, to the second hollow shaft 114-2 protruding from the fuselage 104.

The cable routing system 102 also includes a load transfer structure. Generally, the load transfer structure reacts (i.e., provides a reactive force or support against) the bending and torsional forces exhibited during flight and facilitates a non-bending placement of cables 116 between the independently rotating wings 106-1 and 106-2 and the fuselage 104.

The load transfer structure is coupled to the adjacent outlets of the hollow shafts 114-1 and 114-2, which adjacent outlets are located within the fuselage 104. As described above, components, such as electrical, fluid, and mechanical cables, may be housed within the volume of respective hollow shafts 114-1 and 114-2. As depicted in FIG. 1B, the ends of these hollow shafts 114-1 and 114-2 are open inside the fuselage 104, such that the housed cables 116 can be routed to other aircraft systems, such as the battery 124.

As described above, the cables 116 within the hollow shafts 114-1 and 114-2 extend perpendicularly away from the longitudinal axes of the hollow shafts 114-1 and 114-2, for example, towards the battery 124. That is, in some examples, the cables may exhibit a 90-degree change in direction upon exiting an outlet of a respective hollow shaft 114-1 and 114-2. In general, the load transfer structure facilitates the rotation of the hollow shafts 114-1 and 114-2, whether that rotation is coordinated as depicted in FIGS. 1A-5A or independent as depicted in FIG. 5B. That is, as described above, notwithstanding the resistance of the cables 116 to rotational motion, the wing assembly may pitch relative to the fuselage 104 as depicted in FIGS. 1A and 1B.

The load transfer structure may facilitate this rotation in a variety of forms. In one example, the load transfer structure includes a mass of material 118 that surrounds the adjacent outlets of the respective hollow shafts 114-1 and 114-2. The mass of material 118 is rotationally coupled to the hollow shafts 114-1 and 114-2. That is, as the wings 106-1 and 106-2 rotate from a first position (e.g., a generally horizontal position) as depicted in FIG. 1A to a second position (e.g., a generally vertical position) as depicted in FIG. 1B, the mass of material 118, similarly rotates.

The mass of material 118 has a slot 130 with a cross-sectional arc shape. That is, rather than being an enclosed cross-sectional shape, the mass of material 118 has a portion of the wall removed and has a C-shaped cross-sectional profile with the open portion aligning with the perpendicular extension direction of the housed cables 116. The C-shaped slot 130 allows the wings 106-1 and 106-2 to pitch while the cables 116 are maintained in a set orientation.

Returning to FIG. 1A, to further prevent the cables 116 from rotating along with the wings 106-1 and 106-2, and thus introducing rotation resistance forces, the cable routing system 102 further includes a clamp 126 adjacent to the load transfer structure. The clamp 126 may be rigidly attached to an interior surface of the fuselage 104. Accordingly, the clamp 126 may constrain the exiting ends of the cables 116 to prevent them from rotating/bending as the wings 106-1 and 106-2 rotate. As described above, preventing the cables 116 from bending confines their motion to twisting, thereby reducing the spring-like resistance to wing rotation.

In an example, the size of the slot 130 may be an arc with a predetermined angular size. For example, the arc may be equal to or greater than 90 degrees, and in some examples, equal to or greater than 120 or 160 degrees. This may facilitate the complete range of motion of the wings 106-1 and 106-2. For example, the wings 106-1 and 106-2 may have a range of motion from −25 degrees below a horizontal reference line, such as the fuselage 104 longitudinal axis, to +135 degrees above the fuselage 104 longitudinal axis. When the wings 106-1 and 106-2 are in the generally horizontal position as depicted in FIG. 1A, the cables 116 may be adjacent to one side of the C-shaped slot 130. When the wings 106-1 and 106-2 are in the generally vertical position as depicted in FIG. 1B, the cables may be adjacent to the opposite side of the C-shaped slot 130. Accordingly, the C-shaped slot 130 may be sized to accommodate a full targeted range of motion of the wings 106-1 and 106-2.

The cable routing system 102 may take various forms to facilitate the rotational coupling of the hollow shafts 114-1 and 114-2 and the mass of material 118. For example, the mass of material 118 may be integrated with the hollow shafts 114-1 and 114-2 as a single component as depicted in FIGS. 4A and 4B. In another example, the mass of material 118 may be a separate component from the hollow shafts 114-1 and 114-2. In this example, the mass of material 118 may be securely fixed to the hollow shafts 114-1 and 114-2 as depicted in FIGS. 2A-3B. In either case, this rotational coupling ensures that any torsional loads are self-reacted within the wing assemblies, rather than being transmitted to another component within the aircraft 100. A secure attachment also prevents torsional losses and relative rotation of one wing to the other.

As described above, a C-shaped slot 130 may reduce the strength of a tubular structure due to the reduced amount of material. However, the mass of material 118, by having an increased cross-sectional shape relative to the hollow shafts 114-1 and 114-2, may be able to withstand the wing assembly bending stresses. That is, the increased width of the mass of material 118 opposite the slot 130 provides bending and torsional stiffness to the cable routing system 102.

As described above, the load transfer structure may rotate with the hollow shafts 114-1 and 114-2 and respective wings 106-1 and 106-2. Put another way, the load transfer structure may rotate independently from the fuselage 104. To facilitate this relative rotation, the cable routing system 102 further includes at least one bearing 120-1 and 120-2 per hollow shaft 114-1 and 114-2 to support an associated hollow shaft 114-1 and 114-2. The bearings 120-1 and 120-2 may be offset from the adjacent outlets of the respective hollow shafts 114-1 and 114-2. The bearings 120-1 and 120-2 may sit in respective bearing housings 122-1 and 122-2. The bearing housings 122-1 and 122-2 may be rigidly mounted to a respective wing 106-1 and 106-2 or the fuselage 104.

The bearings 120-1 and 120-2 and bearing housings 122-1 and 122-2 may be housed within the fuselage 104. For example, a first bearing 120-1 and first bearing housing 122-1 may be affixed to the fuselage 104 and receive the first hollow shaft 114-1, which protrudes from the first wing 106-1. During assembly, the first wing 106-1 may be positioned adjacent to the fuselage 104, with the first hollow shaft 114-1 inserted into the first bearing 120-1. Accordingly, the first wing 106-1 may be separable from the fuselage 104.

Similarly, a second bearing 120-2 and a second bearing housing 122-2 may be affixed to the fuselage 104 and receive the second hollow shaft 114-2, which protrudes from the second wing 106-2. During assembly, the second wing 106-2 may be positioned adjacent to the fuselage 104, with the second hollow shaft 114-2 being inserted into the second bearing 120-2. Accordingly, the second wing 106-2 may be separable from the fuselage 104.

Figure 2A:
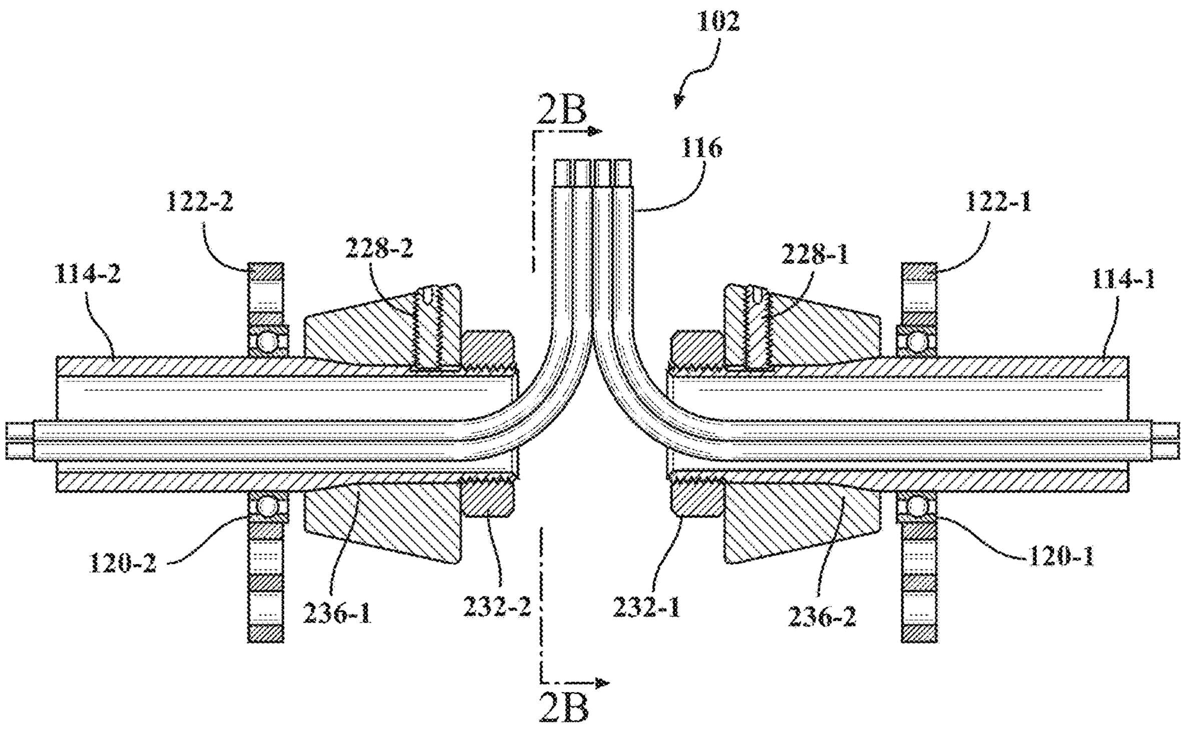
FIGS. 2A and 2B are cross-sectional views of a cable routing system with threaded collets, according to principles described herein.
Figure 2B:
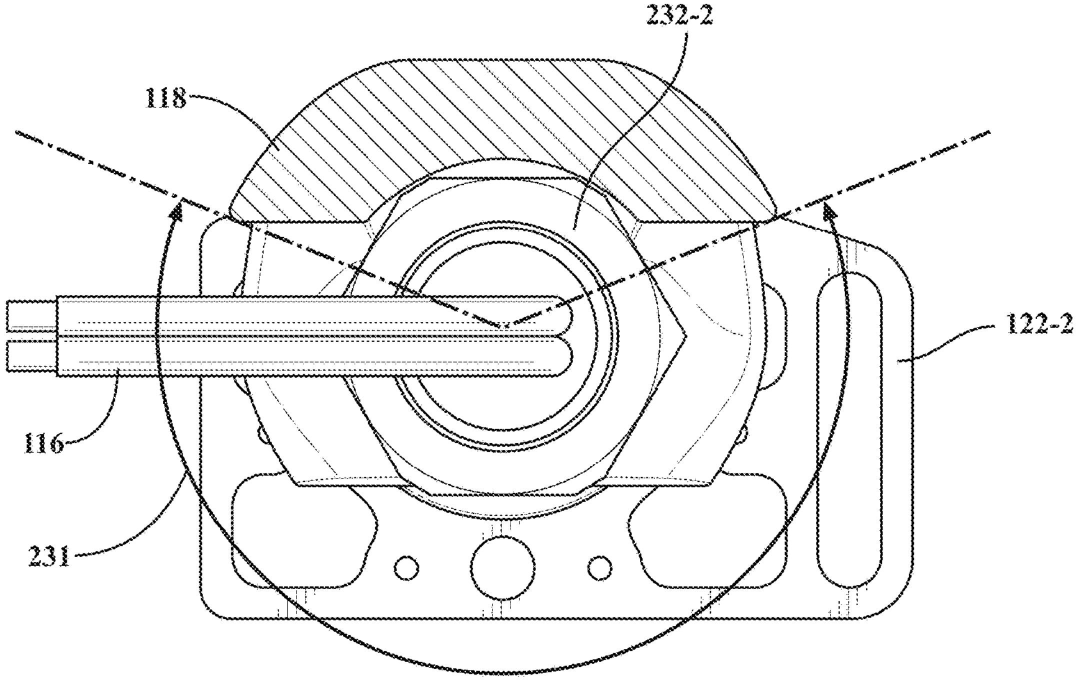

FIGS. 2A and 2B are cross-sectional views of a cable routing system with tapered hollow shafts 114-1 and 114-2, according to principles described herein. Specifically, FIG. 2A is a cross-sectional view taken along the line 2A in FIG. 1A and FIG. 2B is a cross-sectional view taken along the line 2B in FIG. 2A.

As described above, in some examples, the mass of material 118 is a separate physical component from the hollow shafts 114-1 and 114-2. To ensure torsional and bending load transfer, the mass of material 118 is securely fixed to the hollow shafts 114-1 and 114-2. In the example depicted in FIGS. 2A and 2B, this secure attachment is via collet receivers 236-1 and 236-2, threaded collets at ends of the respective hollow shafts 114-1 and 114-2, and threaded nuts 232-1 and 232-2.

Specifically, the mass of material 118 includes a first collet receiver 236-1 adapted to receive a first threaded collet of the first hollow shaft 114-1. That is, the inside diameter of the first collet receiver 236-1 may taper (i.e., change in inside diameter), with a larger end of the taper being towards a distal, outward side (lefthand side in the orientation of FIG. 2A), of the mass of material 118 and a smaller end of the taper being located closer to the center of the mass of material 118.

Similarly, the mass of material 118 includes a second collet receiver 236-2 adapted to receive a second threaded collet of the second hollow shaft 114-2. That is, the inside diameter of the second collet receiver 236-2 may taper (i.e., change in inside diameter), with a larger end of the taper being towards a distal, outward side (righthand side in the orientation of FIG. 2A), of the mass of material 118 and a smaller end of the taper being located closer to the center of the mass of material 118. In this example, both the first hollow shaft 114-1 and the second hollow shaft 114-2 have tapered collets that match the collet receivers 236-1 and 236-2.

Also in this example, the load transfer structure further includes a first shaft nut 232-1 that is adapted to engage with threads on the first threaded collet end on the first hollow shaft 114-1 to draw the first hollow shaft 114-1 into the first collet receiver 236-1. That is, as the threads on the first threaded collet engage with the threads on the first shaft nut 232-1, the first hollow shaft 114-1 is drawn into the first collet receiver 236-1, which provides a tight fit. The friction forces between the first collet receiver 236-1 and the tapered end of the first hollow shaft 114-1 prevent rotational slip of the two components.

Similarly, the load transfer structure further includes a second shaft nut 232-2 adapted to engage with threads on the second threaded collet end on the second hollow shaft 114-2 to draw the second hollow shaft 114-2 into the second collet receiver 236-2. As the threads on the second threaded collet engage with the threads on the second shaft nut 232-2, the second hollow shaft 114-2 is drawn into the second collet receiver 236-2, which provides a tight fit. The friction forces between the second collet receiver 236-2 and the tapered end of the second hollow shaft 114-2 prevent rotational slip of the two components. Thus, via both receiver/collet interactions, both hollow shafts 114-1 and 114-2 and the mass of material 118 rotate in unison. That is, this collet system prevents torsional transfer losses, ensuring that the wings 106-1 and 106-2 rotate in a coordinated fashion. The matching of the taper on the hollow shafts 114-1 and 114-2 and the matching negative taper of the collet receivers 236-1 and 236-2 and the secure attachment of the two components via respective shaft nuts 232-1 and 232-2 ensures that any torsional load is self-reactive within the wing assembly, meaning that additional support structures may not need to be relied on to support the bending and torsional loads exhibited across the wing assembly.

In an example, the load transfer structure may include a mechanism to ensure the wings 106-1 and 106-2 are correctly aligned. That is, as described above, the wings 106-1 and 106-2 may be separable from the fuselage 104. The hollow shafts 114-1 and 114-2 or the bearing (120-1 and 120-2) and bearing housings (122-1 and 122-2) may be attached to either component. However, it may be desirable that the wings 106-1 and 106-2 are precisely aligned with one another (i.e., having the same pitch) and relative to the fuselage 104. Accordingly, the cable routing system 102 may include additional components to ensure this alignment. Specifically, the cable routing system 102 may include a first protrusion 228-1 that extends inward from the first collet receiver 236-1. The first protrusion 228-1 is adapted to sit within a first groove in the first threaded collet end of the first hollow shaft 114-1 to align the first wing 106-1 with the mass of material 118 at a particular orientation. In an example, the first protrusion 228-1 may be a set screw that can be inserted into the groove either before or after the first hollow shaft 114-1 has been fully seated into the first collet receiver 236-1.

Similarly, the cable routing system 102 may include a second protrusion 228-2 that extends inward from the second collet receiver 236-2. The second protrusion 228-2 is adapted to sit within a second groove in the second threaded collet end of the second hollow shaft 114-2 to align the second wing 106-2 with the mass of material 118 at a particular orientation. In an example, the second protrusion 228-2 may be a set screw that can be inserted into the groove either before or after the second hollow shaft 114-2 has been fully seated into the second collet receiver 236-2. As described herein, the protrusion/groove interaction indexes the respective hollow shafts 114-1 and 114-2 to a particular angle.

FIG. 2B also specifically depicts the width of the opening 231 of the slot 130 that is formed into the radial wall of the mass of material 118, which slot 130 facilitates the rotation of the wings 106-1 and 106-2 while preventing the bending of the cables 116 when the wings 106-1 and 106-2 rotate. As described above and as depicted in FIG. 2B, as the wings (and mass of material 118) rotate, the ends of the cables 116 may be constrained in place and be prevented from rotating along with the wings 106-1 and 106-2 and the mass of material 118. While the rotation of the wings 106-1 and 106-2 may cause the cables 116 to twist longitudinally, this induces less stress than if the cables 116 were bent as the wings 106-1 and 106-2 rotate. Thus, the present cable routing system 102 preserves the life of the cables 116 by inducing less cyclic stress. Further, the present cable routing system 102 decreases the internal aircraft volume required to accommodate the cable rotation.

Figure 3A:
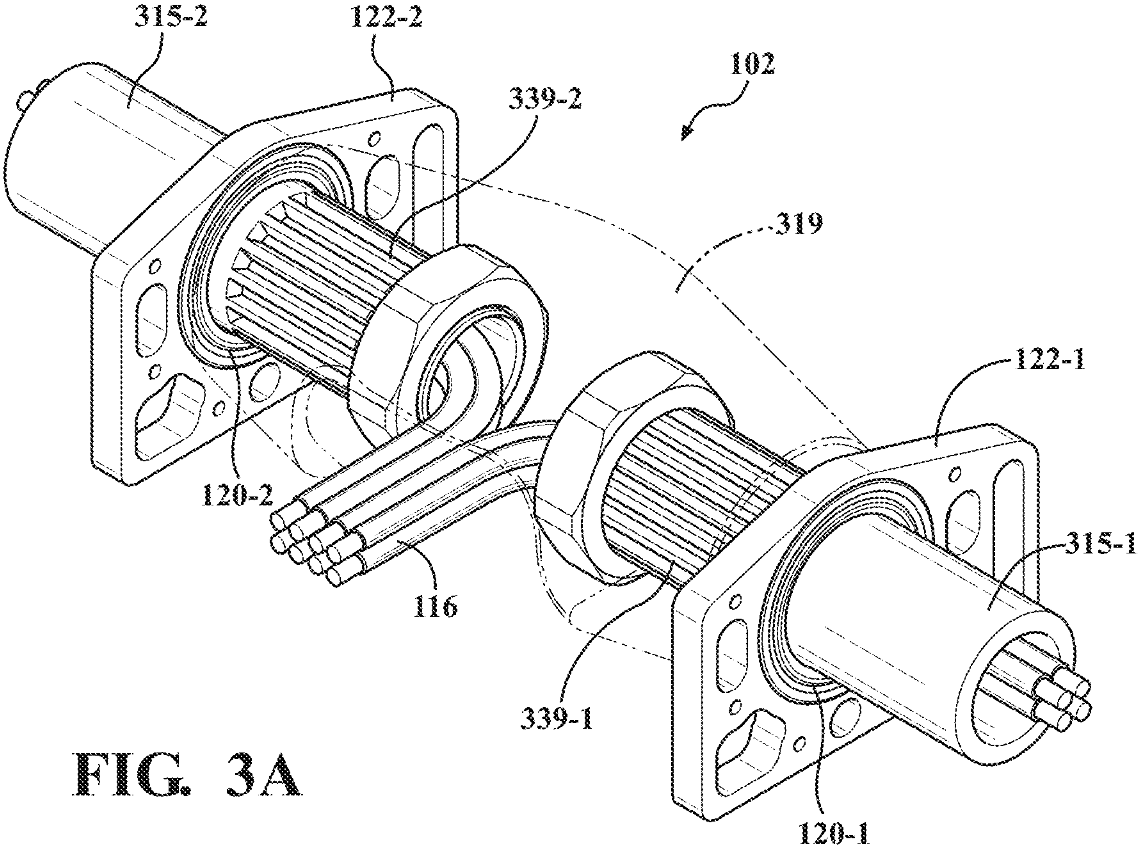
FIGS. 3A and 3B are views of a cable routing system with splined shafts, according to principles described herein.
Figure 3B:
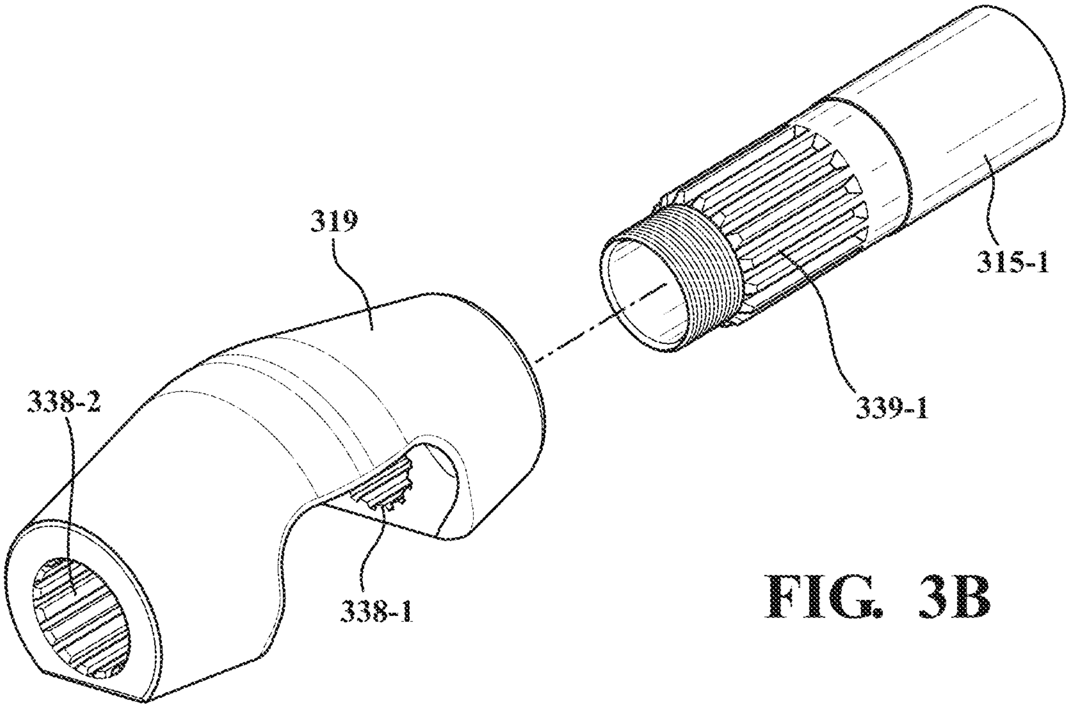
Figure 4A:
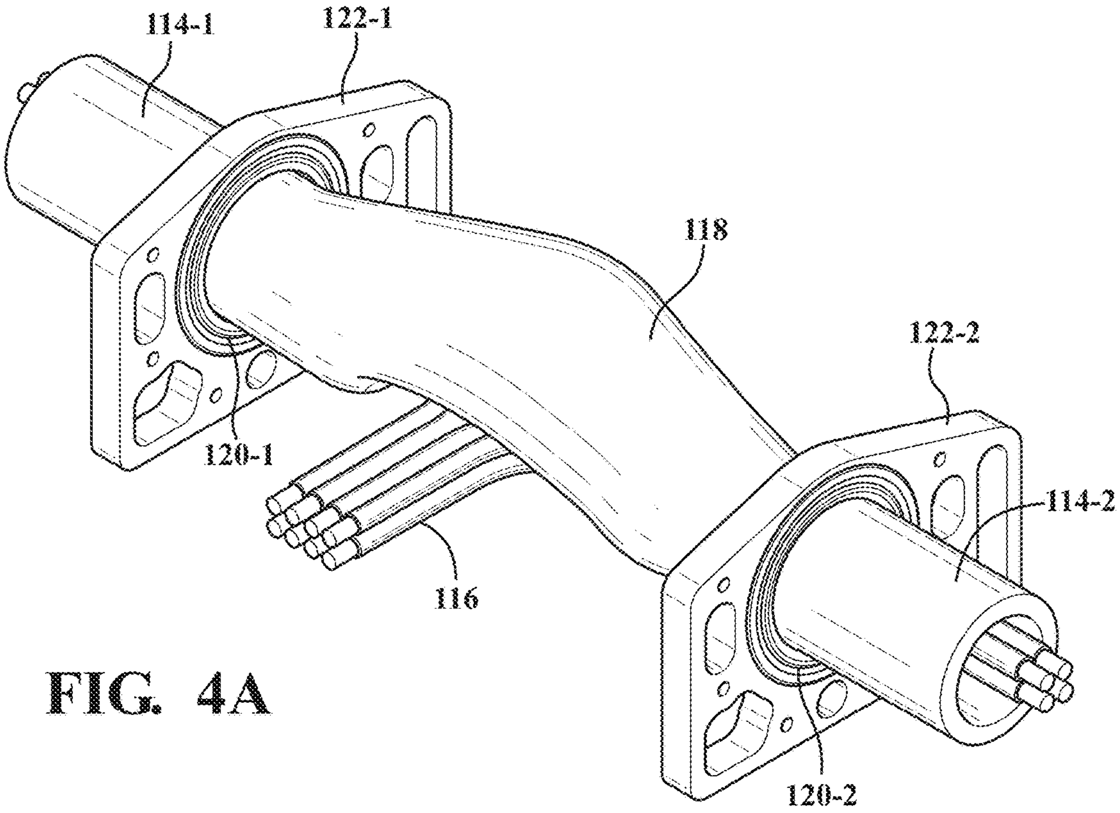
FIGS. 4A and 4B are views of a cable routing system with integrated shafts and load transfer structure, according to principles described herein.
Figure 4B:
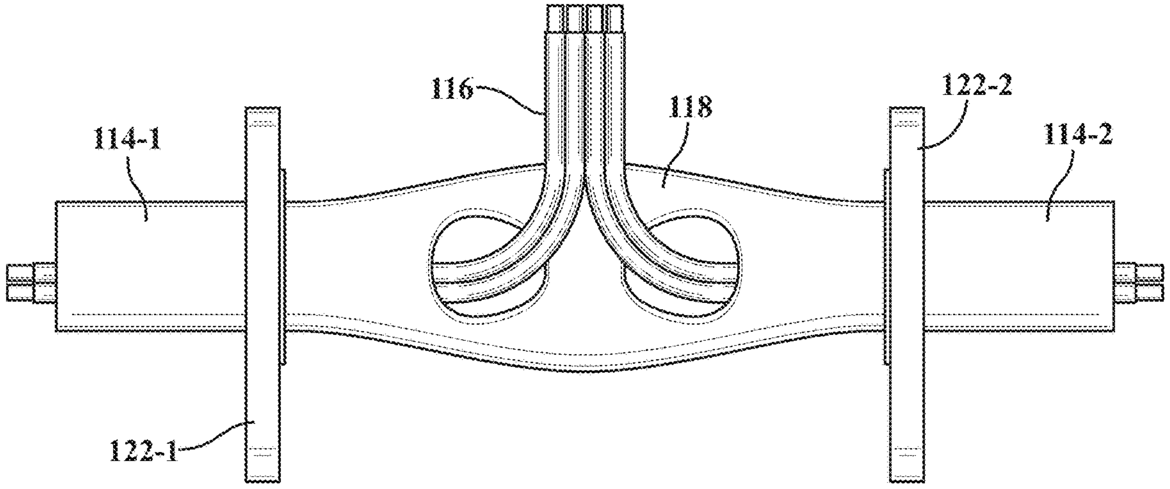

FIGS. 3A and 3B are views of a cable routing system with splined shafts, according to principles described herein. Specifically, FIG. 3A is an isometric view of the splined shaft-based mass of material 319 and FIG. 3B is an exploded view of one half of the splined shaft-based mass of material 319.

That is, in the example depicted in FIGS. 1A-2B, the mass of material 118 was prevented from rotating relative to the hollow shafts 114-1 and 114-2 via a conical taper. In the example depicted in FIGS. 3A and 3B, the mass of material 319 includes a first interior spline 338-1, or a series of longitudinally-raised ridges. The first interior spline 338-1 is adapted to receive and mate with the externally splined end 339-1 of the first hollow shaft 315-1. That is, the ridges of the first interior spline 338-1 mate with ridges in the externally-splined end of the first hollow shaft 315-1.

Similarly, the mass of material 319 includes a second interior spline 338-2 adapted to receive and mate with an externally-splined end 339-2 of the second hollow shaft 315-2. Similar in function to the conical taper, pairing these splined surfaces prevents rotational slip between the mass of material 319 and the hollow shafts 315-1 and 315-2, such that the wings 106-1 and 106-2 rotate in unison about the pitch axis. As in the example depicted in FIGS. 2A-2B, the first hollow shaft 315-1 and the second hollow shaft 315-2 may each be drawn into the respective splined surface via respective shaft nuts 232-1 and 232-2.

FIGS. 4A and 4B are views of a cable routing system 102 with integrated shafts 114-1 and 114-2 and load transfer structure, according to principles described herein. Specifically, FIG. 4A is an isometric top-down view of the cable routing system 102, while FIG. 4B is a bottom view of the cable routing system 102. In the example depicted in FIGS. 4A and 4B, rather than having the mass of material 118 be separate from the hollow shafts 114-1 and 114-2, the first hollow shaft 114-1, the second hollow shaft 114-2, and the mass of material 118 are an integrated component, in some cases formed of a single body. For example, the mass of material 118 may be welded or bonded to the first hollow shaft 114-1 and the second hollow shaft 114-2. In another example, the mass of material 118 and the hollow shafts 114-1 and 114-2 are a single body. In this example, access outlets may be formed in the mass of material 118 as depicted in FIG. 4B, for example, during molding. As depicted in FIG. 4B, the cables 116 may be passed through these apertures, through the clamp 126, and to the power source (e.g., the battery 124).

Figure 5A:
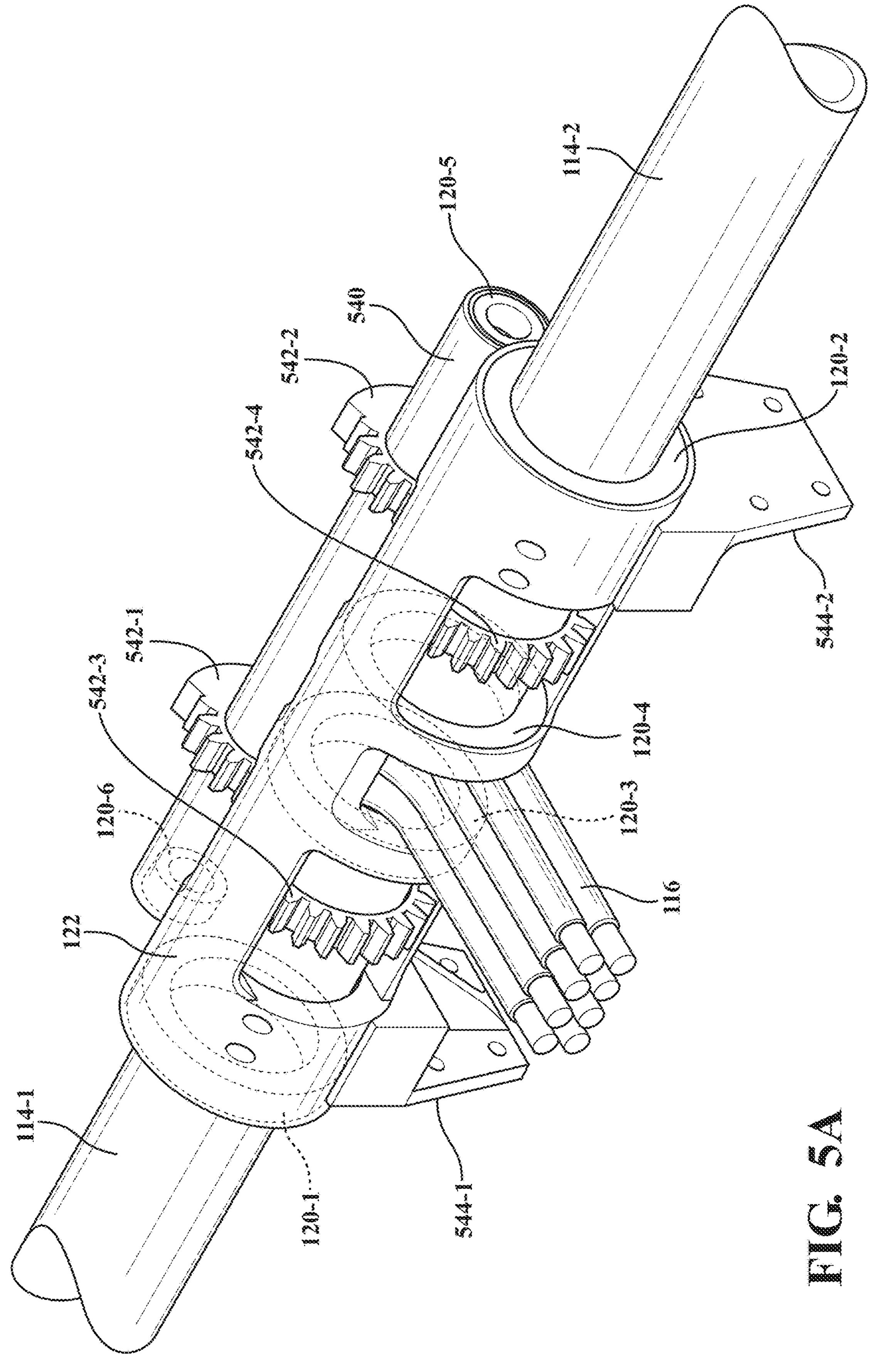
FIGS. 5A and 5B illustrate another bearing housing-based cable routing system, according to principles described herein.
Figure 5B:
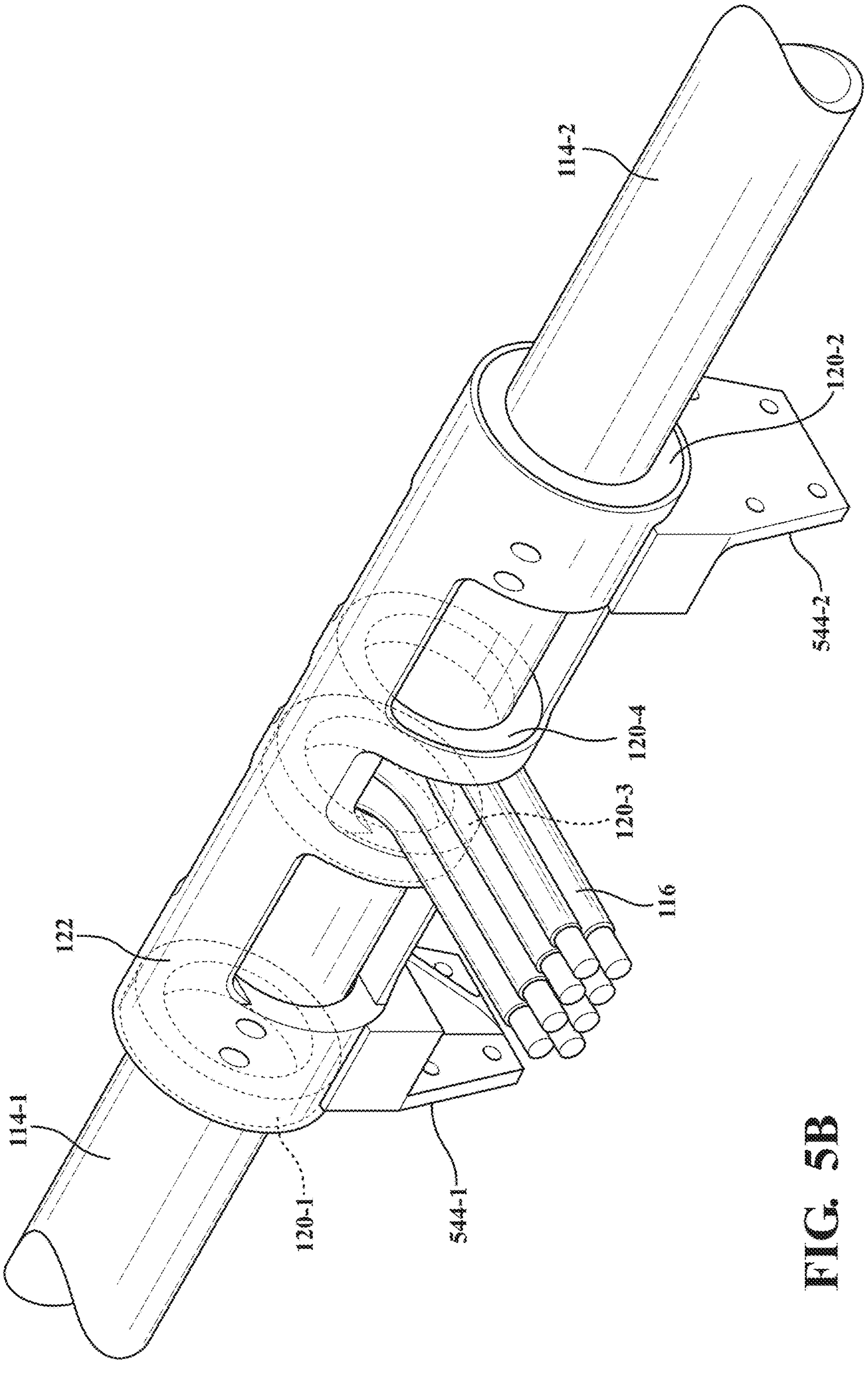

FIGS. 5A and 5B illustrate another bearing housing-based cable routing system, according to principles described herein. Specifically, in the example depicted in FIG. 5A, the load transfer structure includes a shaft 540 that is parallel to, and offset from, the first hollow shaft 114-1 and the second hollow shaft 114-2. The shaft 540 includes a first offset shaft gear 542-1 that is adapted to interact with a first hollow shaft gear 542-3. The shaft 540 also includes a second offset shaft gear 542-2 that is adapted to interact with a second hollow shaft gear 542-4. Via the interaction of these gear pairs, torque is transferred between the respective hollow shafts 114-1 and 114-2 and the wings 106-1 and 106-2 to which they are coupled. Thus, the wings 106-1 and 106-2 may rotate in unison.

The shaft 540 may be rigidly mounted to the body of the fuselage 104. However, as the shaft 540 rotates and the fuselage 104 does not, there may be relative rotational motion between these components. Accordingly, the shaft 540 may be mounted to the body of the fuselage 104 via bearings 120-5 and 120-6 that allow the shaft 540 to rotate and be coupled to a stationary support (i.e., the fuselage 104).

In this example, the bending moment, rather than being self-reactive and contained within the load transfer structure itself, is transmitted to the fuselage 104. Specifically, each hollow shaft 114-1 and 114-2 may be supported at two locations. For example, the first hollow shaft 114-1 may be supported by a first bearing 120-1 and a third bearing 120-3. Similarly, the second hollow shaft 114-2 may be supported by a second bearing 120-2 and a fourth bearing 120-4. In an example, each of these bearings is supported within a shared bearing housing 122. These two bearings per hollow shaft 114-1 and 114-2 react bending loads into the fuselage 104 through the bearing housing 122 and mounting brackets 544-1 and 544-2, instead of having the load transfer between the left and right hollow shafts 114-1 and 114-2 as depicted in previous examples.

In the example depicted in FIG. 5B, the load transfer structure facilitates the independent rotation of the hollow shafts 114-1 and 114-2 and the respective wings 106-1 and 106-2. Specifically, the load transfer structure includes the bearing housing 122 that receives the first hollow shaft 114-1 of the first wing 106-1 and the second hollow shaft 114-2 of the second wing 106-2. As compared to the example depicted in FIG. 5A, in this example, the torsional motion is not transferred between the different wings 106-1 and 106-2, rather, the torsional motion of each wing 106-1 and 106-2 is independent from one another. As in the example depicted in FIG. 5A, the bending moment, rather than being self-reactive and contained within the load transfer structure itself, is transmitted to the fuselage 104. Specifically, each hollow shaft 114-1 and 114-2 may be supported at two locations. For example, the first hollow shaft 114-1 may be supported by a first bearing 120-1 and a third bearing 120-3. Similarly, the second hollow shaft 114-2 may be supported by a second bearing 120-2 and a fourth bearing 120-4. In an example, each of these bearings is supported within a shared bearing housing 122 in the fuselage 104. These two bearings per hollow shaft 114-1 and 114-2 react bending loads into the fuselage 104 through the bearing housing 122 and mounting brackets 544-1 and 544-2, instead of having the load transfer between the left and right hollow shafts 114-1 and 114-2 as depicted in previous examples.

As such, via the examples depicted herein, the cable routing system 1) accommodates the rotation of these two bodies, 2) facilitates power transfer between the rotating bodies, 3) prevents stress on the cables, 4) reduces the rotation-resisting forces that the bending cables may induce, and 5) decreases the volume required to accommodate the movement of the cables.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-5B, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A cable routing system, comprising:
- a first hollow shaft extending through a first wing attached to a fuselage of an aircraft;
- a second hollow shaft extending through a second wing attached to the fuselage, the first and second hollow shafts rotate about a pitch axis independently of the fuselage; and
- a load transfer structure coupled to adjacent outlets of the hollow shafts that are within the fuselage, cables within the hollow shafts exit the adjacent outlets perpendicularly away from a longitudinal axis of the hollow shafts, the load transfer structure facilitates rotation of the hollow shafts relative to the fuselage.

2. The cable routing system of claim 1, wherein the load transfer structure facilitates coordinated rotation of the hollow shafts.

3. The cable routing system of claim 2, wherein:
- the load transfer structure comprises a mass of material surrounding the adjacent outlets;
- the mass of material rotates with the hollow shafts; and
- the mass of material has a slot with a cross-sectional arc of greater than 90 degrees.

4. The cable routing system of claim 3, wherein the first hollow shaft, the second hollow shaft, and the mass of material are an integrated component.

5. The cable routing system of claim 3, wherein:
- the mass of material comprises:
  - a first collet receiver, the first collet receiver is adapted to receive a first threaded collet of the first hollow shaft; and
  - a second collet receiver, the second collet receiver is adapted to receive a second threaded collet of the second hollow shaft; and
- the load transfer structure further comprises:
  - a first shaft nut, the first shaft nut is adapted to engage with the first threaded collet of the first hollow shaft and draw the first hollow shaft into the first collet receiver; and
  - a second shaft nut, the second shaft nut is adapted to engage with the second threaded collet of the second hollow shaft and draw the second hollow shaft into the second collet receiver.

6. The cable routing system of claim 5, further comprising:
- a first protrusion extending inward from the first collet receiver, the first protrusion is adapted to sit within a first groove in the first threaded collet and align the first wing with the mass of material; and
- a second protrusion extending radially inward from the second collet receiver, the second protrusion is adapted to sit within a second groove in the second threaded collet and align the second wing with the mass of material.

7. The cable routing system of claim 3, wherein:
- the mass of material comprises:
  - a first interior spline, the first interior spline is adapted to receive an externally-splined end of the first hollow shaft; and
  - a second interior spline, the second interior spline is adapted to receive an externally-splined end of the second hollow shaft.

8. The cable routing system of claim 2, wherein:
- the load transfer structure further comprises at least one bearing per hollow shaft; and
- the at least one bearing per hollow shaft rotationally supports an associated hollow shaft.

9. The cable routing system of claim 8, wherein:
- the first wing and second wing are separable from the fuselage; and
- the cable routing system further comprises:
  - a first bearing within the fuselage to receive the first hollow shaft; and
  - a second bearing within the fuselage to receive the second hollow shaft.

10. The cable routing system of claim 1, wherein the load transfer structure comprises a shaft parallel to and offset from the adjacent outlets; the shaft comprises:
- a first offset shaft gear, the first offset shaft gear is adapted to interact with a first hollow shaft gear; and
- a second offset shaft gear, the second offset shaft gear is adapted to interact with a second hollow shaft gear.

11. The cable routing system of claim 1, further comprising a clamp, adjacent to the load transfer structure, the clamp is adapted to constrain exiting ends of the cables.

12. The cable routing system of claim 1, wherein:
- the load transfer structure facilitates independent rotation of the hollow shafts relative to the fuselage; and
- the load transfer structure comprises a bearing housing to receive the first hollow shaft of the first wing and the second hollow shaft of the second wing.

* * * * *